US010144329B2

(12) United States Patent
Ogawa et al.

(10) Patent No.: US 10,144,329 B2
(45) Date of Patent: Dec. 4, 2018

(54) HEADREST

(71) Applicants: Mazda Motor Corporation, Hiroshima (JP); NTN CORPORATION, Osaka (JP)

(72) Inventors: Kazuharu Ogawa, Hiroshima (JP); Shunsuke Sueda, Hiroshima (JP); Ryo Sawai, Hiroshima (JP); Masahiro Kawai, Shizuoka (JP)

(73) Assignees: MAZDA MOTOR CORPORATION, Hiroshima (JP); NTN CORPORATION, Osaka (JP)

(*) Notice: Subject to any disclaimer, the term of this patent is extended or adjusted under 35 U.S.C. 154(b) by 136 days.

(21) Appl. No.: 15/506,337

(22) PCT Filed: Sep. 3, 2015

(86) PCT No.: PCT/JP2015/075114
§ 371 (c)(1),
(2) Date: Feb. 24, 2017

(87) PCT Pub. No.: WO2016/043060
PCT Pub. Date: Mar. 24, 2016

(65) Prior Publication Data
US 2018/0222367 A1 Aug. 9, 2018

(30) Foreign Application Priority Data

Sep. 17, 2014 (JP) ................. 2014-188947

(51) Int. Cl.
*B60N 2/853* (2018.01)
*B60N 2/80* (2018.01)

(52) U.S. Cl.
CPC ............ *B60N 2/853* (2018.02); *B60N 2/80* (2018.02)

(58) Field of Classification Search
None
See application file for complete search history.

(56) References Cited

U.S. PATENT DOCUMENTS 4,244,623 A * 1/1981 Hall ..................... A47C 1/03
297/411.36
4,540,217 A 9/1985 Suzuki
(Continued)

FOREIGN PATENT DOCUMENTS

EP 0447150 A2 * 9/1991 ........... F16D 41/088
JP 59-32420 2/1984
(Continued)

OTHER PUBLICATIONS

International Preliminary Report on Patentability and Written Opinion of the International Searching Authority dated Mar. 21, 2017 in International (PCT) Application No. PCT/JP2015/075114.
(Continued)

*Primary Examiner* — David E Allred
(74) *Attorney, Agent, or Firm* — Wenderoth, Lind & Ponack, L.L.P.

(57) ABSTRACT

A headrest includes a reverse input blocking clutch and a displacement mechanism. The reverse input blocking clutch includes input and output shafts that respectively receive and output rotational torque, an outer ring and a side plate in which rotation is restricted, cylindrical rollers that control blocking of the rotational torque reversely input from the output shaft and transmission of the rotational torque from the input shaft through engagement and disengagement between the outer ring and output shaft, and a cage to retain the cylindrical rollers. The displacement mechanism has one end fixed to stays and another end fixed to a headrest main body positioned at a top of a seat back, and displaces the headrest main body through the rotational torque from the output shaft of the reverse input blocking clutch. The
(Continued)

another end of displacement mechanism has the side plate of the reverse input blocking clutch mounted thereto.

4 Claims, 9 Drawing Sheets

(56) References Cited

U.S. PATENT DOCUMENTS

| | | | |
|---|---|---|---|
| 6,000,760 A | 12/1999 | Chung | |
| 9,132,756 B1* | 9/2015 | Witte | B60N 2/847 |
| 2005/0184549 A1* | 8/2005 | Robinson | B60N 2/01583 |
| | | | 296/65.03 |
| 2008/0197681 A1* | 8/2008 | Jayasuriya | B60N 2/838 |
| | | | 297/216.12 |
| 2014/0077549 A1* | 3/2014 | Battey | A47C 1/032 |
| | | | 297/284.7 |

FOREIGN PATENT DOCUMENTS

| | | |
|---|---|---|
| JP | 2006-168627 | 6/2006 |
| JP | 2007-239520 | 9/2007 |
| JP | 2013-244157 | 12/2013 |
| WO | 98/18367 | 5/1998 |

OTHER PUBLICATIONS

International Search Report dated Dec. 1, 2015 in International (PCT) Application No. PCT/JP2015/075114.

* cited by examiner

HEADREST

TECHNICAL FIELD

The present invention relates to a headrest arranged at a top of a seat back of a seat and configured to support a head of an occupant from the rear.

BACKGROUND ART

In general, a seat of a vehicle has, at a top of a seat back thereof, a headrest configured to support a head of an occupant from the rear. The headrest is brought as close as possible to the head of the occupant. Thus, when the vehicle is collided from behind, the headrest receives the head of the occupant from the rear to alleviate an impact, thereby being capable of preventing the occupant from suffering whiplash injury.

It is desired that the headrest of this type be fixed at a position as close as possible to a head of an occupant so that the impact caused by the collision on the vehicle can be alleviated. Meanwhile, when a head of an occupant is always held in contact with the headrest during driving, the occupant may have a feeling of discomfort. Thus, inplace of the above-mentioned fixed headrest, there has been proposed a movable headrest enabling positional adjustment with respect to a head of an occupant (see, for example, Patent Literature 1).

The movable headrest disclosed in Patent Literature 1 includes a headrest tilting mechanism in the headrest main body. The movable headrest is rotatable about a rotary shaft of the headrest tilting mechanism, thereby enabling positional adjustment of a headrest main body in forward and backward directions. In the movable headrest, the headrest main body includes a base gear arranged on a seat back stay side and a lock gear arranged on a headrest main body side. The headrest main body has a configuration in which a locking teeth of the lock gear are to be meshed with locking teeth of the base gear. A meshing position of the locking teeth of the lock gear with respect to the locking teeth of the base gear corresponds to a locking position of the headrest main body.

CITATION LIST

Patent Literature 1: 2013-244157

SUMMARY OF INVENTION

Technical Problem

Incidentally, in the headrest disclosed in Patent Literature 1, the configuration in which the locking teeth of the lock gear are to be meshed with the locking teeth of the base gear is adopted. Thus, the locking position of the headrest main body is adjustable in the forward and backward directions in a stepped manner. In this stepped positional adjustment, it is difficult for various occupants to set the headrest mainbody to an optimum position. Thus, there may be caused a feeling of discomfort to the occupant.

The present invention has been proposed in view of the above-mentioned problem, and has an object to provide a headrest which can secure comfort by enabling a headrest main body to be set to an optimum position for an occupant.

Solution to Problem

As a technical measure to achieve the above-mentioned object, according to one embodiment of the present invention, there is provided a headrest, comprising: a reverse input blocking clutch and a displacement mechanism. The reverse input blocking clutch comprises: an input-side member to which a rotational torque is to be input; an output-side member from which the rotational torque is to be output; a stationary-side member in which a rotation is restricted; a plurality of engaging elements configured to control a block of the rotational torque reversely input from the output-side member and a transmission of the rotational torque input from the input-side member through engagement and disengagement between the stationary-side member and the output-side member; and a cage configured to retain the plurality of engaging elements between the stationary-side member and the output-side member. The displacement mechanism has one end fixed to a seat back and another end fixed to a headrest main body positioned at a top of the seat back, and is configured to displace the headrest main body with respect to the seat back through the rotational torque from the output-side member of the reverse input blocking clutch. The another end of the displacement mechanism has the stationary-side member of the reverse input blocking clutch mounted thereto.

According to the present invention, the rotational torque input from the input-side member of the reverse input blocking clutch is transmitted to the output-side member which is released from a locked state through disengagement of the engaging elements. The rotation of the output-side member allows the headrest main body to be smoothly displaced in a stepless manner through intermediation of the displacement mechanism. The stepless displacement of the headrest main body allows the headrest main body to be arranged at an optimum position for an occupant, thereby being capable of securing comfort.

Regarding the rotational torque reversely input from the output-side member of the reverse input blocking clutch through intermediation of the displacement mechanism of the headrest main body, the output-side member shifts to the locked state through engagement of the engaging elements between the output-side member and the stationary-side member. The headrest main body is fixed by virtue of the locked state of the output-side member, and thus the head of the occupant can securely be supported from the rear by the headrest main body, thereby being capable of securing safety.

It is desired that the displacement mechanism according to the present invention be constructed by parallel links. In this manner, through construction of the displacement mechanism by the parallel links, the headrest main body can be moved horizontally in forward and backward directions by the displacement mechanism. As a result, the headrest main body being horizontally moved can be maintained in a fixed posture. Thus, even when the occupant presses his/her head against the headrest main body, the occupant feels less discomfort and obtains a good sense of use.

It is desired that the engaging elements of the reverse input blocking clutch according to the present invention be cylindrical rollers. In this manner, when the cylindrical rollers are used as the engaging elements, the rotational torque reversely input from the output-side member can smoothly be blocked, and the rotational torque input from the input-side member can smoothly be transmitted. As a result, operation of the reverse input blocking clutch can be stabilized.

Advantageous Effects of Invention

According to the present invention, with the reverse input blocking clutch and the displacement mechanism, the rotational torque input from the input-side member of the reverse input blocking clutch can be transmitted to the output-side member which is released from the locked state through disengagement of the engaging elements. The rotation of the output-side member allows the headrest main body to be smoothly displaced in the stepless manner through intermediation of the displacement mechanism. The stepless displacement of the headrest main body allows the headrest main body to be arranged at an optimum position for an occupant. Thus, a headrest which can secure comfort as well as operability and safety can be provided.

DESCRIPTION OF EMBODIMENTS

Figure 2:
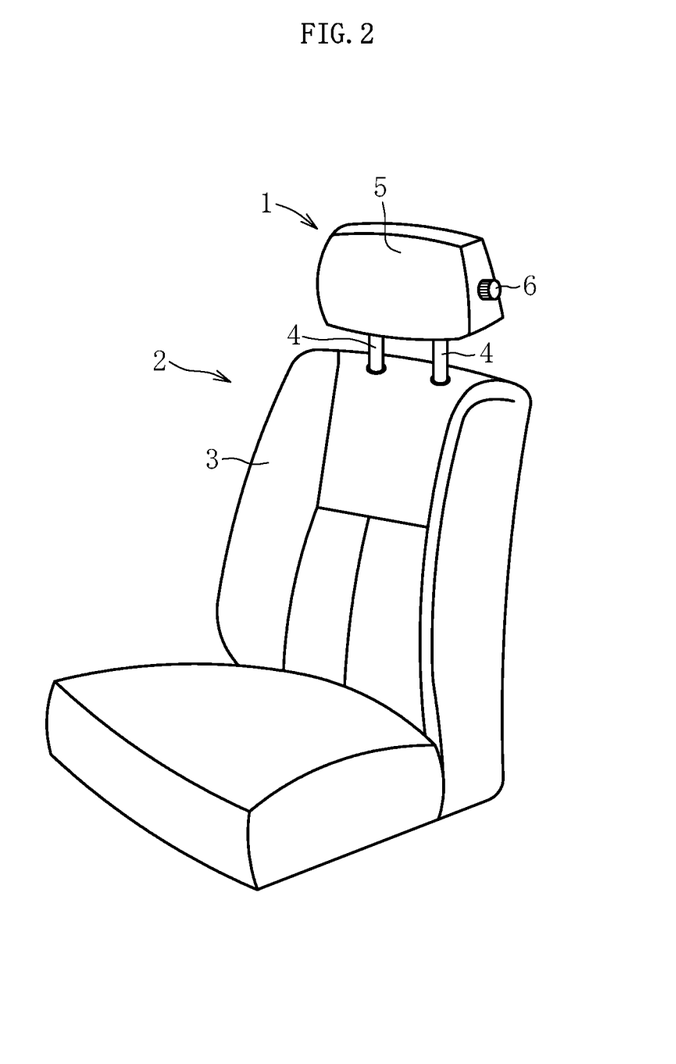
FIG. 2 is a perspective view for illustrating a seat comprising the headrest mounted at a top of a seat back.
Figure 3:
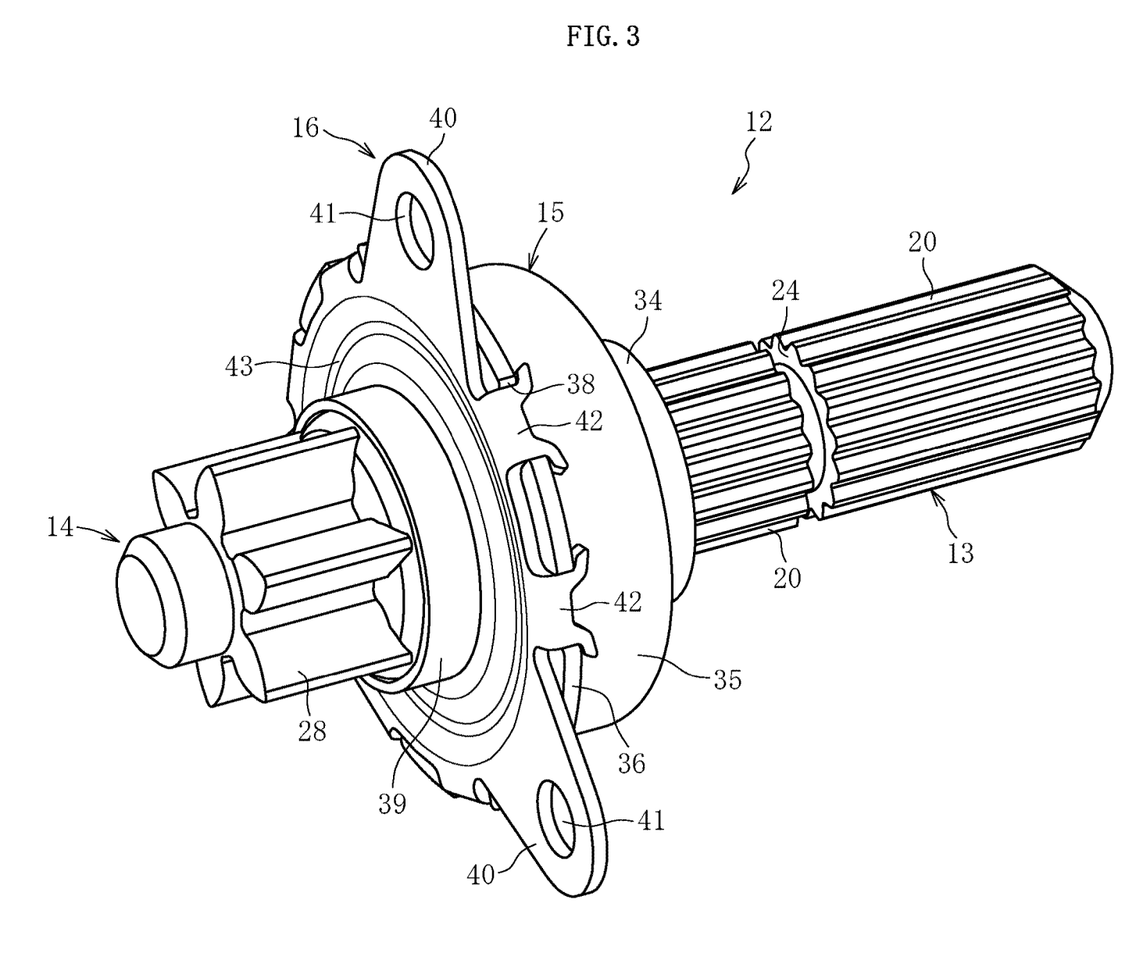
FIG. 3 is a perspective view for illustrating an overall configuration of the reverse input blocking clutch in an assembled state.
Figure 4:
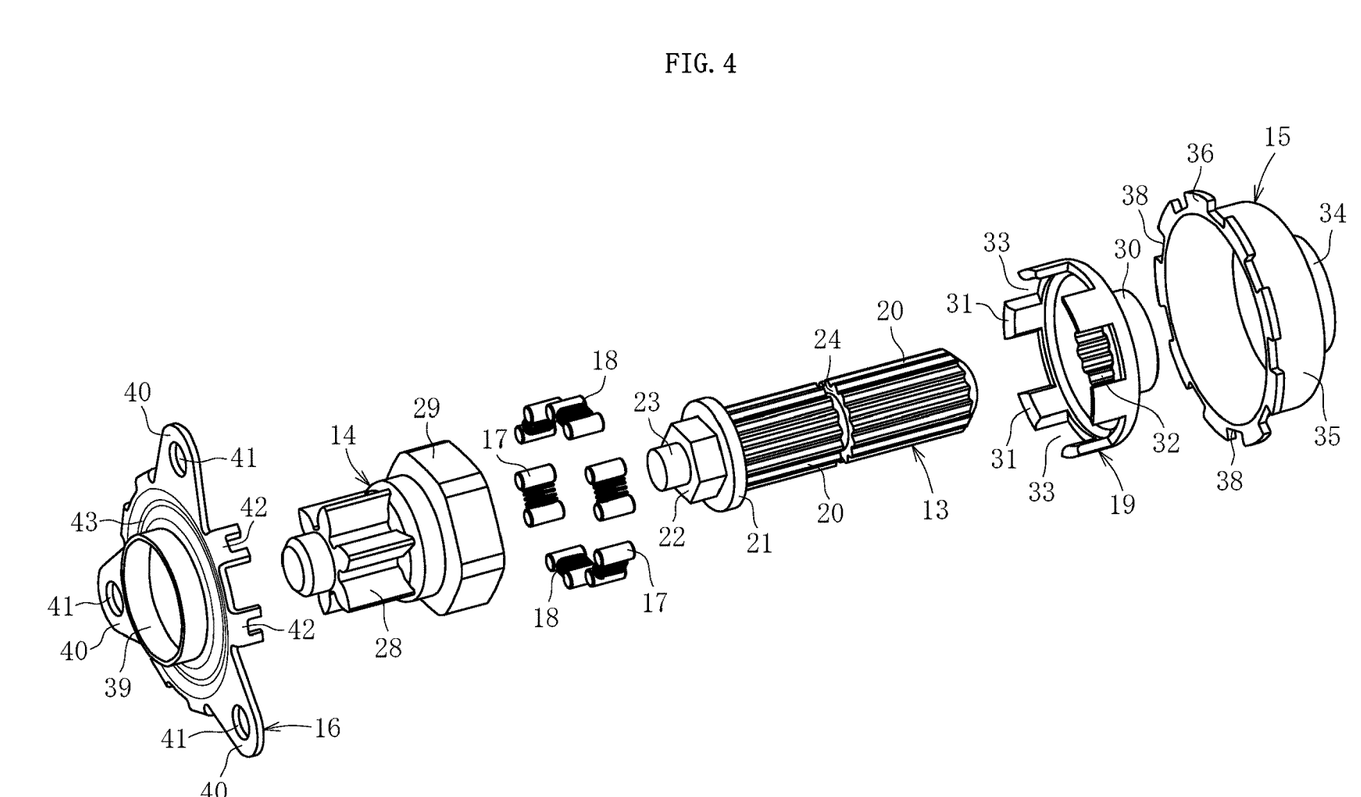
FIG. 4 is a perspective view for illustrating the overall configuration of the reverse input blocking clutch in a disassembled state.
Figure 5:
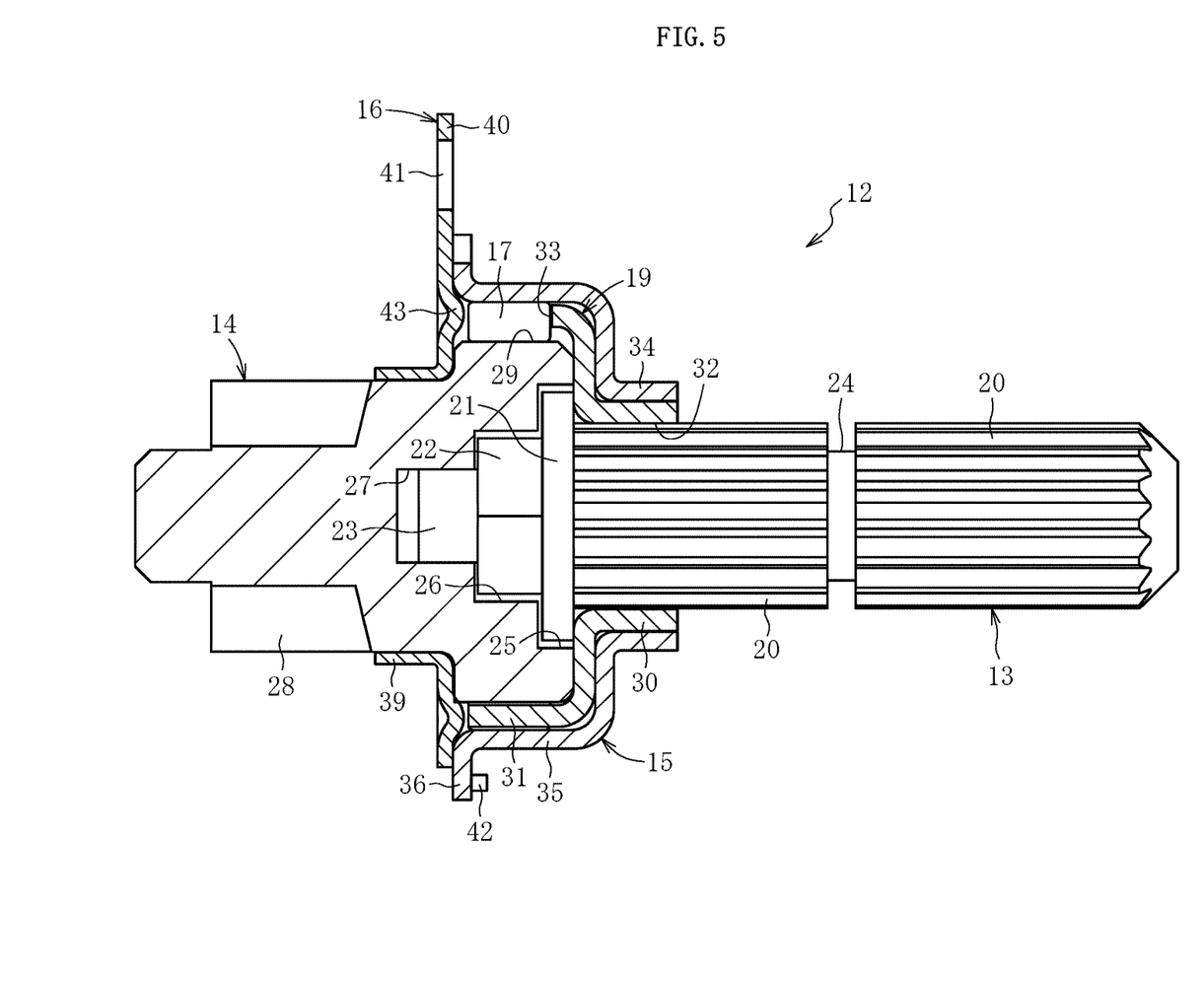
FIG. 5 is a sectional view for illustrating the overall configuration of the reverse input blocking clutch.
Figure 6:
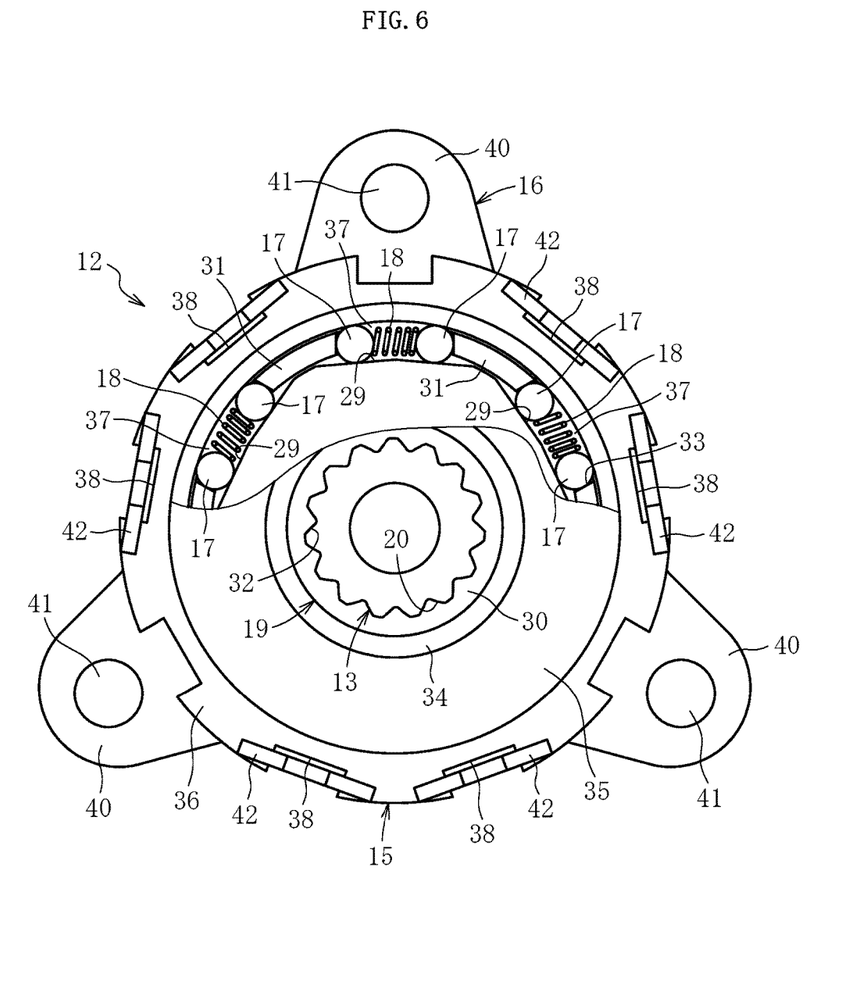
FIG. 6 is a right side view of FIG. 5 (partly including omitted parts).
Figure 7:
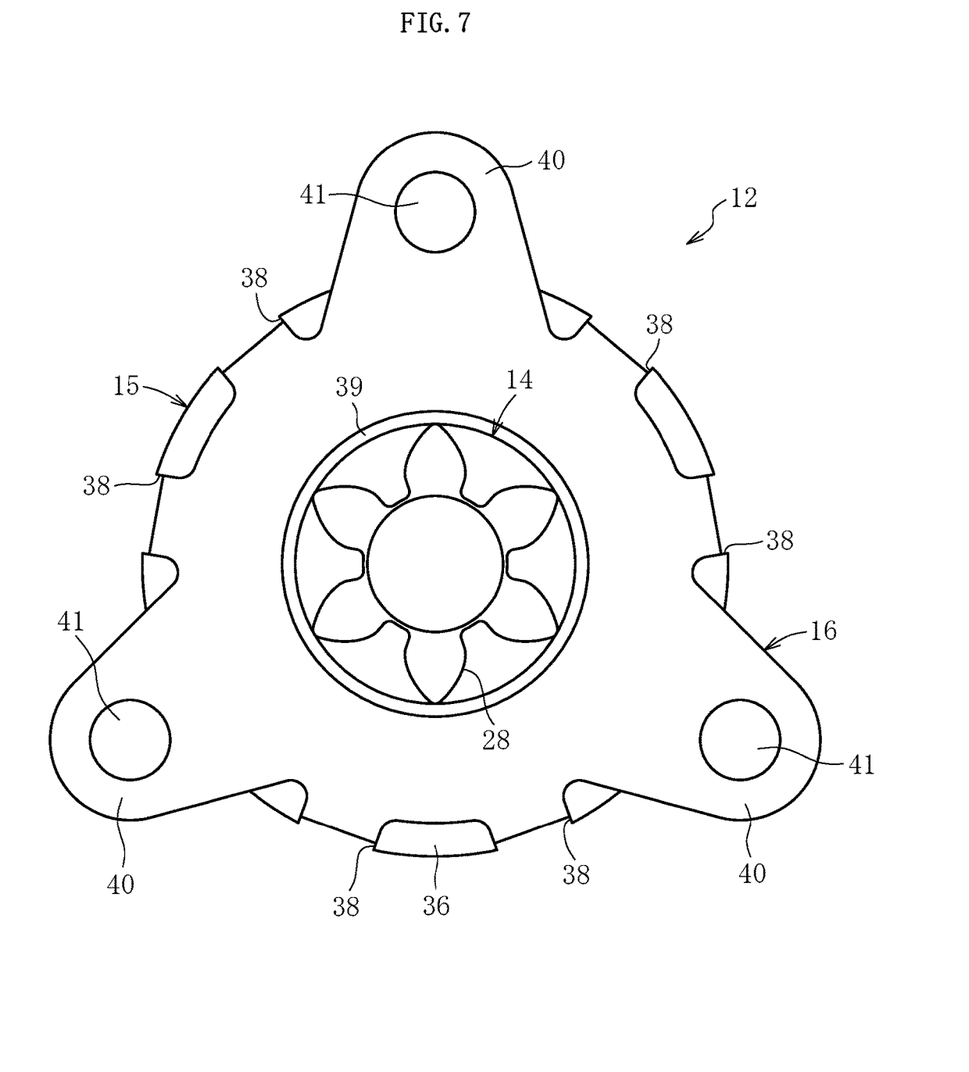
FIG. 7 is a left side view of FIG. 5.

As illustrated in FIG. 2, in a seat 2 mounted to, for example, an automobile, a headrest 1 configured to support a head of an occupant from the rear is mounted at a top of a seat back 3 through intermediation of stays 4 in a vertically-movable manner so as to be brought into contact with a head of an occupant in upward and downward directions in an optimum state. Further, the headrest 1 is brought as close as possible to the head of the occupant in forward and backward directions. Thus, when a vehicle is collided from behind, the headrest 1 receives the head of the occupant from the rear to alleviate an impact, thereby being capable of preventing the occupant from suffering whiplash injury. Meanwhile, the head of the occupant is always held in contact with the headrest 1 during driving, the occupant may have a feeling of discomfort. Thus, the movable headrest 1 enabling positional adjustment with respect to the head of the occupant in the forward and backward directions is given.

Figure 1A:
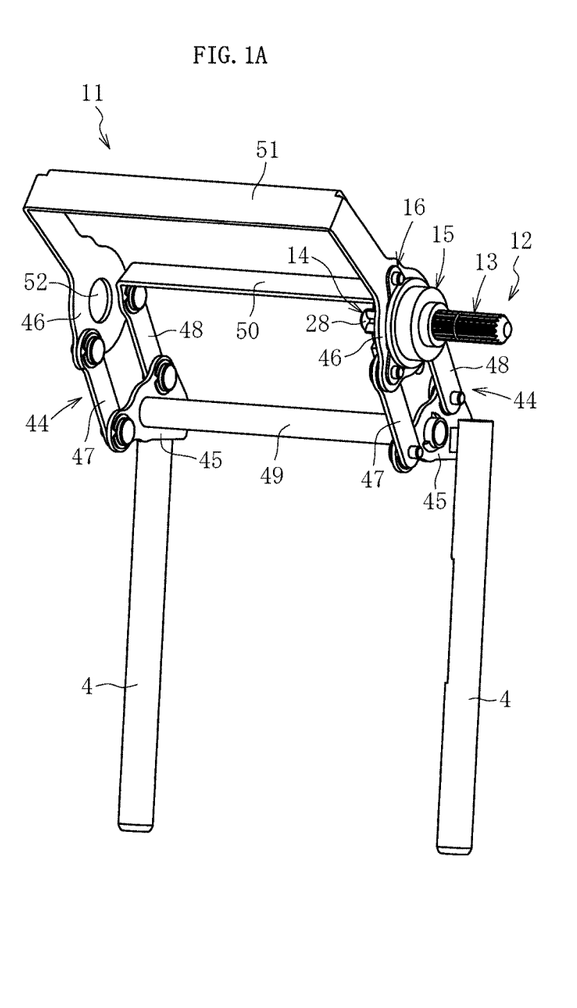
FIG. 1A is a perspective view for illustrating a reverse input blocking clutch and a displacement mechanism of a headrest as viewed from a clutch input side according to an embodiment of the present invention.
Figure 1B:
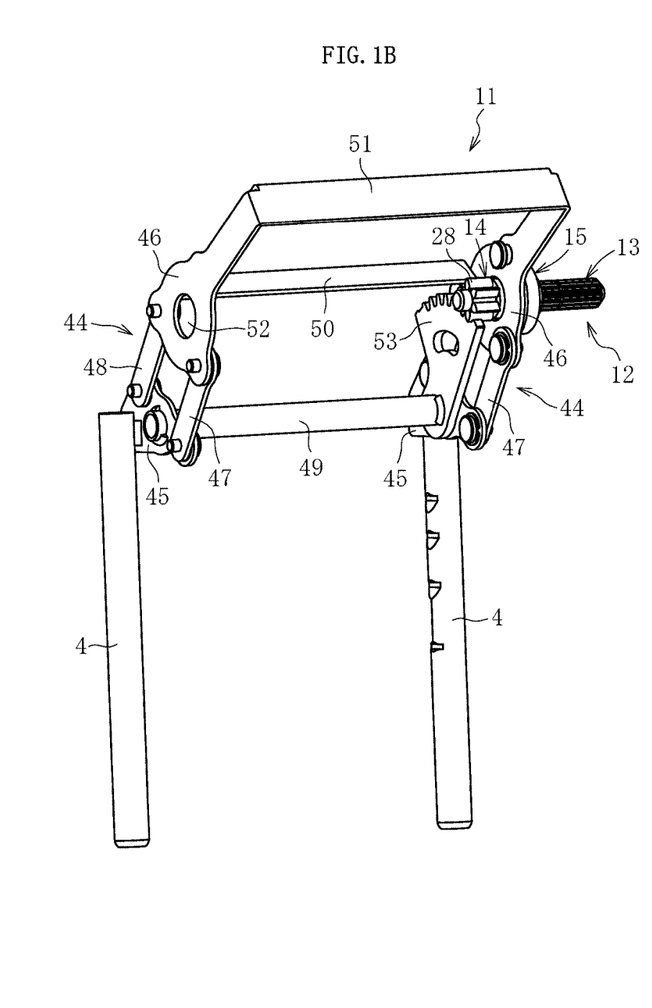
FIG. 1B is a perspective view for illustrating the reverse input blocking clutch and the displacement mechanism of the headrest as viewed from a clutch output side according to the embodiment of the present invention.

As illustrated in FIG. 1A, FIG. 1B and FIG. 2, the movable headrest 1 according to an embodiment of the present invention has a configuration in which a displacement mechanism 11 arranged at the stays 4 extending from the top of the seat back 3 and a reverse input blocking clutch 12 mounted to a part of the displacement mechanism 11 are built in a headrest main body 5.

The reverse input blocking clutch 12 is of a type called a lock type. As illustrated in FIG. 3 to FIG. 7, the reverse input blocking clutch 12 mainly comprises an input shaft 13 as an input-side member to which a rotational torque is to be input, an output shaft 14 as an output-side member from which the rotational torque is to be output, an outer ring 15 and a side plate 16 as stationary-side members in which the rotation is restricted, a plurality of pairs of cylindrical rollers 17 as engaging elements configured to control a block of the rotational torque reversely input from the output shaft 14 and a transmission of the rotational torque input from the input shaft 13 through engagement and disengagement between the outer ring 15 and the output shaft 14, coil springs 18 as elastic members configured to urge the pairs of cylindrical rollers 17 with a separating force in a circumferential direction, and a cage 19 configured to retain the cylindrical rollers 17 between the outer ring 15 and the output shaft 14. The side plate 16 is a mounting member for mounting the reverse input blocking clutch 12 to the part of the displacement mechanism 11.

In this embodiment, the cylindrical rollers 17 are employed as the engaging elements. However, other engaging elements, e.g., balls can be employed in place of the cylindrical rollers 17. As in this embodiment, when the cylindrical rollers 17 are used as the engaging elements, the rotational torque reversely input from the output shaft 14 can smoothly be blocked, and the rotational torque input from the input shaft 13 can smoothly be transmitted. As a result, operation of the reverse input blocking clutch 12 can be stabilized. Further, the coil springs 18 are used as the elastic members. However, other elastic members, e.g., plate springs can be used in place of the coil springs 18.

The input shaft 13 has male splines 20 extending on an outer peripheral surface thereof in an axial direction. A flange portion 21 for restricting a position of the cage 19 press-fitted to the input shaft 13 is integrally formed at an output-side end of the input shaft 13. A hexagonal protruding portion 22 for transmitting the rotational torque from the input shaft 13 to the output shaft 14 is integrally formed at a distal end of the flange portion 21. A columnar protruding portion 23 for concentrically supporting the output shaft 14 with respect to the input shaft 13 is integrally formed at a distal end of the hexagonal protruding portion 22. An annular groove 24, which receives a retaining ring (not shown) for retaining an operation knob 6 (see, FIG. 2) mounted on an input-side end, is formed at substantially center of the input shaft 13.

In the output shaft 14, a large-diameter recessed portion 25, into which the flange portion 21 of the input shaft 13 is fitted, is formed at an input-side end opposed to the input shaft 13. Further, a hexagonal recessed portion 26, into which the hexagonal protruding portion 22 of the input shaft 13 is fitted so that torque can be transmitted, is formed at a far side of the large-diameter recessed portion 25. Further, a cylindrical recessed portion 27 for axial alignment, into which the columnar protruding portion 23 of the input shaft 13 is fitted, is formed at a far side of the hexagonal recessed portion 26. A pinion gear 28 to be coupled to the displacement mechanism 11 is concentrically formed at an output-side end of the output shaft 14. The pinion gear 28 has six tooth portions. Thus, efficiency of torque transmission between the input shaft and the output shaft is enhanced by forming the protruding portion 22 of the input shaft 13 and the recessed portion 26 of the output shaft 14 into a hexagonal shape. Further, a plurality of (for example, six)

flat cam surfaces 29 are formed on an outer peripheral surface at the input-side end of the output shaft 14 equiangularly. The input-side end of the output shaft 14 functions as an inner ring with respect to the outer ring 15.

The cage 19 has a cylindrical portion 30 press-fitted to the input shaft 13, and a column portion 31 increased in diameter toward a radially outer side from an output-side end of the cylindrical portion 30 and further bent to extend toward an output side in the axial direction. A female spline 32 extending in the axial direction is formed on an inner peripheral surface of the cylindrical portion 30. The column portion 31 retains the plurality of pairs (for example, six pairs) of cylindrical rollers 17 and the coil springs 18 equiangularly. That is, the paired two cylindrical rollers 17 and the coil spring 18 interposed between the paired two cylindrical rollers 17 are retained equiangularly by being received in a pocket 33 located between the column portions 31 in the circumferential direction. In this embodiment, the number of the pairs of cylindrical rollers 17 and the coil springs 18 are six, respectively. However, the numbers may be set arbitrarily.

The outer ring 15 has a cup shape, and has a cylindrical portion 34 externally mounted to the cylindrical portion 30 of the cage 19, a large-diameter portion 35 increased in diameter toward the radially outer side from an output-side end of the cylindrical portion 34 and further bent to extend toward the output side in the axial direction, and a flange portion 36 extending toward the radially outer side by bending an output-side end of the large-diameter portion 35. The cylindrical portion 30 of the cage 19 is slidable relative to the cylindrical portion 34 of the outer ring 15. The large-diameter portion 35 has an internal space for receiving the input-side end of the output shaft 14, the column portion 31 of the cage 19, the cylindrical rollers 17, and the coil springs 18. Wedge clearances 37 are formed between a cylindrical inner peripheral surface of the large-diameter portion 35 and the cam surface 29 of the input-side end of the output shaft 14. The cylindrical rollers 17 and the coil springs 18 are arranged in the wedge clearances 37 under a state of being received in the pockets 33 of the cage 19. A width of the wedge clearance 37 is reduced from a center of the pocket, at which the coil spring 18 is arranged, toward both side portions of the pocket, at which the two cylindrical rollers 17 are arranged. A plurality of cutout recessed portions 38 for fixing the sideplate 16 are equiangularly formed at an outer peripheral edge of the flange portion 36.

The side plate 16 is formed into a disc shape and integrally has the cylindrical portion 39 protruding toward the output side in the axial direction. Three flange portions 40 extending toward the radially outer side and a plurality of claw portions 42 being bent toward an input side in the axial direction are formed at the outer peripheral edge of the side plate 16. Mounting holes 41 for mounting to the displacement mechanism 11 are formed in the flange portions 40. Through formation of the three flange portions 40, the reverse input blocking clutch 12 is stably mounted to the displacement mechanism 11. In this embodiment, the number of the flange portions 40 is three. However, the number may be set arbitrarily. The claw portion 42 is used as the stationary-side member for integrating the side plate 16 with the outer ring 15. Two claw portions 42 are formed between the adjacent flange portions 40. The cylindrical portion 39 is externally mounted to a center of the output shaft 14 in the axial direction. The output shaft 14 is slidable relative to the cylindrical portion 39. Each of the claw portions 42 has a forked distal end, and the claw portions are inserted to corresponding cutout recessed portions 38 of the outer ring 15. Then, the forked distal ends protruding from the flange portions 36 of the outer ring 15 are caulked outward. With this, the claw portions 42 function to fix the side plate 16 to the outer ring 15. In this embodiment, the numbers of the claw portions 42 and the cutout recessed portions 38 are six, respectively. However, the numbers may be set arbitrarily. In the side plate 16 brought into abutment against the flange portion 36 of the outer ring 15, an annular bulging portion 43 extending along the entire periphery is formed so as to protrude toward the column portion 31 of the cage 19. The bulging portion 43 can be brought into abutment against the cylindrical rollers 17 received in the pockets 33 of the cage 19. The bulging portion 43 restricts an axial movement of the cylindrical rollers 17 in the pockets 33, with the result that an axial backlash of the cylindrical rollers 17 is prevented. Further, through positional restriction of the cylindrical rollers 17 to an input shaft 13 side, a contact area between an inner peripheral surface of the outer ring 15 and the cam surface 29 of the output shaft 14 is secured.

As illustrated in FIG. 1A and FIG. 1B, the reverse input blocking clutch 12 having the above-mentioned configuration is mounted to the part of the displacement mechanism 11. The displacement mechanism 11 configured to displace the headrest main body 5 (see FIG. 2) by the rotational torque from the output shaft 14 of the reverse input blocking clutch 12 is constructed by a right and left pair of parallel links 44 with respect to the headrest main body 5. Fixed ends of parallel links 44 are fixed to the stays 4 extending from the seat back 3, and movable ends of the parallel links 44 are fixed to the headrest main body 5. The reverse input blocking clutch 12 is mounted to the movable end of one of the pair of parallel links 44.

The displacement mechanism 11 of this embodiment comprises substantially triangular lower brackets 45, which are fixed to upper ends of the two stays 4 mounted to right and left tops of the seat back 3 in a protrudable and retractable manner, substantially triangular upper brackets 46 fixed to the headrest main body 5, and pairs of band plate-like link members 47 and 48 which connect the lower brackets 45 and the upper brackets 46 to each other. The lower brackets 45 serve as the fixed ends of the parallel links 44, and the upper brackets 46 serve as the movable ends of the parallel links 44. Each of the lower brackets 45 has one corner portion at which the upper end of the stay 4 is fixed, and the rest two corner portions to which one ends of the link members 47 and 48 are rotatably mounted. Meanwhile, each of the upper brackets 46 has two corner portions to which another ends of the link members 47 and 48 are rotatably mounted.

Center portions of the pair of lower brackets 45 are connected to each other with a shaft-shaped coupling member 49. Further, the two link members 47 and 48 are band plate members formed into a strip. One link member 48 integrally has a connecting portion 50 for connecting another ends of the link members 48 mounted to the upper brackets 46. Further, the upper bracket 46 also integrally has a U-shaped connecting portion 51 for connecting one corner portions of the upper brackets 46, to which the link members 47 and 48 are not mounted. The pair of parallel links 44 located on right and left sides of the headrest main body 5 is coupled to each other by the coupling member 49 and the connecting portions 50 and 51, thereby preventing an undesirable deformation of the displacement mechanism 11. Thus, the strength of the displacement mechanism 11 can be secured. Further, the connecting portion 51 is mounted and fixed to the headrest main body 5.

In this displacement mechanism 11, clutch mounting holes 52 are formed in the upper brackets 46. The clutch mounting holes 52 are formed in both the upper brackets 46 so as to be applicable to any of a right-hand drive vehicle or a left-hand drive vehicle. The output shaft 14 of the reverse input blocking clutch 12 is inserted into the clutch mounting hole 52 of one of the upper brackets 46, and the pinion gear 28 is projected toward an inside of the upper bracket 46. The reverse input blocking clutch 12 is mounted to the upper bracket 46 by fixing with screw through use of the holes 41 of the three flange portions 40 of the side plate 16. The another ends of the link members 47 and 48 are rotatably mounted at screwed positions through use of the two holes 41 of the flange portions 40 among the three holes 41 of the flange portions 40. A substantially fan-shaped sector gear 53, which is meshed with the pinion gear 28 of the output shaft 14 of the reverse input blocking clutch 12, is firmly fixed at a shaft end of the above-mentioned coupling member 49 under a state of being in proximity to the lower bracket 45.

In the headrest 1 having the above-mentioned configuration, in a case where a head of an occupant presses the headrest main body 5 backward during normal driving, even when the rotational torque is reversely input to the output shaft 14 of the reverse input blocking clutch 12 through intermediation of the upper bracket 46 and the sector gear 53 of the displacement mechanism 11, the coil spring 18 urges the pairs of cylindrical rollers 17 with a separating force in the circumferential direction in the reverse input blocking clutch 12. Thus, the cylindrical rollers 17 are brought into engagement with the wedge clearances 37 between the output shaft 14 and the outer ring 15, with the result that the output shaft 14 is locked with respect to the outer ring 15. The headrest main body 5 is fixed by virtue of the locked state of the output shaft 14, and thus the head of the occupant can securely be supported from the rear by the headrest main body 5, thereby being capable of securing safety. Also when the vehicle is collided from behind, the head rest main body 5 receives the head of the occupant from the rear to alleviate an impact, thereby being capable of preventing the occupant from suffering whiplash injury.

Meanwhile, in this headrest 1, when the rotational torque is input to the input shaft 13 of the reverse input blocking clutch 12 through rotation of the operation knob 6 arranged at a side portion of the headrest main body 5, the column portion 31 of the cage 19 press-fitted to the input shaft 13 is brought into abutment against the cylindrical rollers 17 and presses the cylindrical rollers 17 against an elastic force. With this, the cylindrical rollers 17 are disengaged from the wedge clearances 37, with the result that the output shaft 14 is released from the locked state. The release of the output shaft 14 from the locked state allows the rotational torque from the input shaft 13 to be transmitted to the output shaft 14 through the hexagonal protruding portion 22 of the input shaft 13 and the hexagonal recessed portion 26 of the output shaft 14, with the result that the output shaft 14 is rotated. The rotation of the operation knob 6 can be performed through simple operation of the occupant by one hand.

Figure 8:
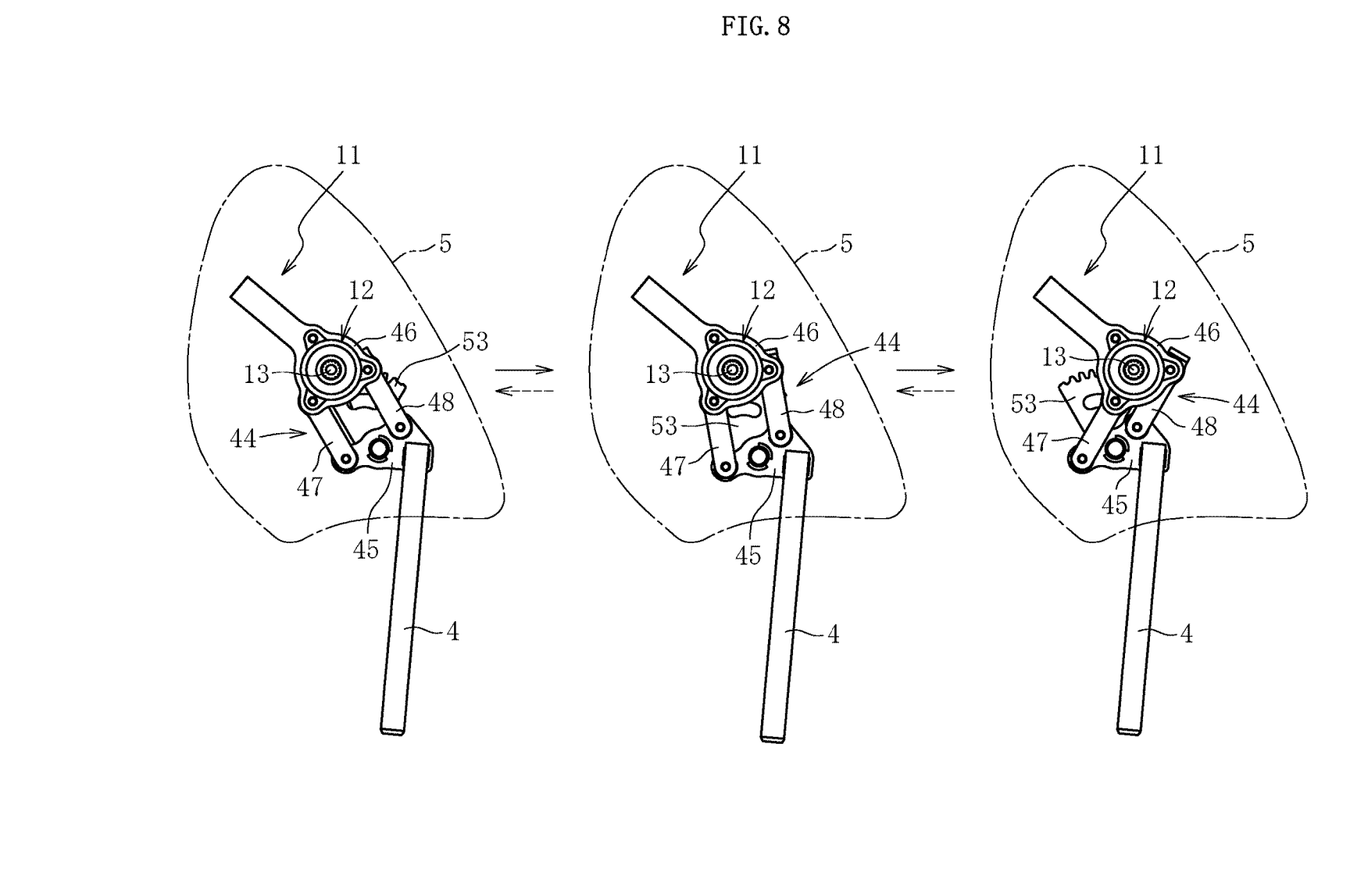
FIG. 8 is a view for illustrating operations of the reverse input blocking clutch and the displacement mechanism of the headrest as viewed from the clutch input side.
Figure 9:
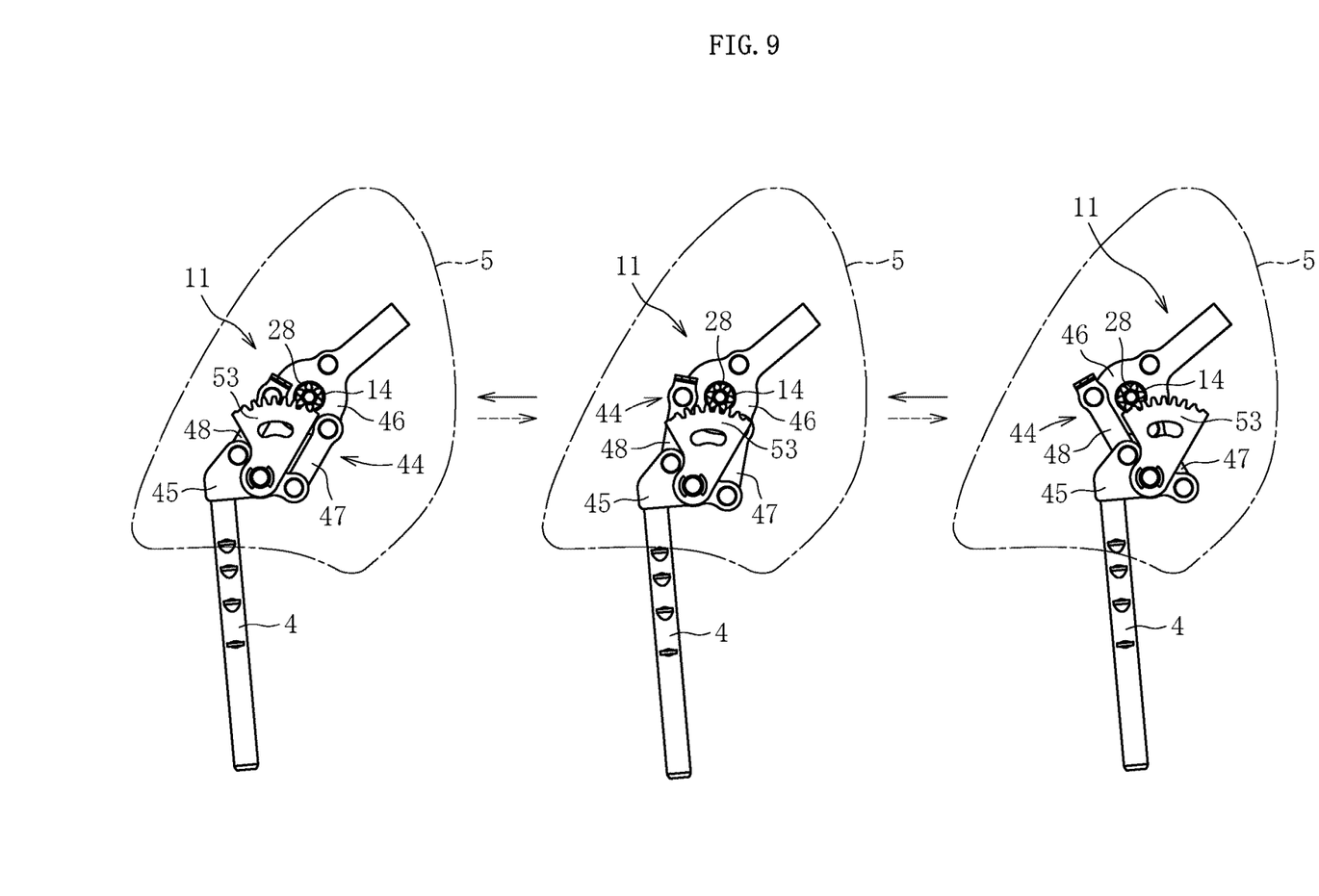
FIG. 9 is a view for illustrating operations of the reverse input blocking clutch and the displacement mechanism of the headrest as viewed from the clutch output side.

Herein, FIG. 8 and FIG. 9 are illustrations of states in which the headrest main body 5 is displaced. FIG. 8 is an illustration of the reverse input blocking clutch 12 of the headrest main body 5 as viewed from the input side. The left side in FIG. 8 corresponds to a front of the headrest, whereas the right side in FIG. 8 corresponds to a rear of the headrest. Further, FIG. 9 is an illustration of the reverse input blocking clutch 12 of the headrest main body 5 as viewed from the output side. The right side in FIG. 9 corresponds to the front of the headrest, whereas the left side in FIG. 9 corresponds to the rear of the headrest. In FIG. 9, the lower bracket 45, the link members 47 and 48, and the upper bracket 46 of the displacement mechanism 11, which are located on a near side in FIG. 9, are omitted.

The rotation of the output shaft 14 of the reverse input blocking clutch 12 allows the pinion gear 28 of the output shaft 14, which is meshed with the sector gear 53 firmly fixed to the coupling member 49 of the lower bracket 45 being the fixed end of the displacement mechanism 11, to move on the sector gear 53 while rotating. With this, the headrest main body 5 is displaced in the forward and backward directions with the parallel links 44, together with the movable end of the displacement mechanism 11 arranged with respect to the fixed end of the displacement mechanism 11 through intermediation of the link members 47 and 48, that is, the entire reverse input blocking clutch 12 arranged at the upper bracket 46. For example, when the operation knob 6 is rotated in a clockwise direction, the headrest main body 5 is moved in a backward direction (see the solid arrow in FIG. 9). Meanwhile, when the operation knob 6 is rotated in a counterclockwise direction, the headrest main body 5 is moved in a forward direction (see the dashed line in FIG. 9).

In the headrest 1, the pinion gear 28 of the output shaft 14 of the reverse input blocking clutch 12 is moved on the sector gear 53 with an arc-shaped locus, and thus the headrest main body 5 is slightly moved in the upward and downward directions by about several millimeters. However, the displacement mechanism 11 is constructed by the parallel links 44, and hence the headrest main body 5 is moved substantially horizontally in the forward and backward directions. As a result, the headrest main body 5 being horizontally moved can be maintained in a fixed posture. Even when the occupant presses his/her head against the headrest main body 5, the head is pressed against the fixed contact surface. Thus, the occupant feels less discomfort and obtains a good sense of use. In this manner, the rotation of the output shaft 14 of the reverse input blocking clutch 12 allows the headrest main body 5 to be smoothly displaced in a stepless manner through intermediation of the displacement mechanism 11. The stepless displacement of the headrest main body 5 allows the headrest main body 5 to be arranged at an optimum position for the occupant. Thus, comfort can be secured.

In the above-mentioned embodiment, description is made of the case where the displacement mechanism 11 is constructed by the parallel links 44. However, the present invention is not limited thereto, and is also applicable to a rotation-type displacement mechanism having a configuration in which the output shaft 14 of the reverse input blocking clutch 12 is directly coupled to the headrest main body 5, and to a revolution-type displacement mechanism having a configuration in which the output shaft 14 of the reverse input blocking clutch 12 is coupled to the headrest main body 5 through intermediation of a rotating member.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

The invention claimed is:

1. A headrest, comprising:
   a reverse input blocking clutch comprising:
   an input-side member to which a rotational torque is to be input;

an output-side member from which the rotational torque is to be output;
a stationary-side member in which a rotation of at least one of the input-side member and the output-side member is restricted;
a plurality of engaging elements configured to control a block of the rotational torque reversely input from the output-side member through engagement of the engaging elements in wedging clearances with the stationary-side member and the at least one of the input-side member and the output-side member and configured to control a transmission of the rotational torque input from the input-side member through and disengagement of the engaging elements in the wedging clearances with the stationary-side member and the at least one of the input-side member and the output-side member; and
a cage configured to retain the plurality of engaging elements between the stationary-side member and the at least one of the input-side member and the output-side member; and
a displacement mechanism, which has one end fixed to a seat back and another end fixed to a headrest main body positioned at a top of the seat back, and is configured to displace the headrest main body with respect to the seat back through the rotational torque from the output-side member of the reverse input blocking clutch to a sector gear fixed to one of the displacement mechanism and the seat back, the another end of the displacement mechanism having the stationary-side member of the reverse input blocking clutch mounted thereto.

2. The headrest according to claim 1, wherein the displacement mechanism is constructed by parallel links.

3. The headrest according to claim 1, wherein the plurality of engaging elements of the reverse input blocking clutch comprise cylindrical rollers.

4. The headrest according to claim 2, wherein the plurality of engaging elements of the reverse input blocking clutch comprise cylindrical rollers.

* * * * *